United States Patent [19]

Schirmer

[11] Patent Number: 5,663,002
[45] Date of Patent: Sep. 2, 1997

[54] ORIENTED FILM WITH IMPROVED HEAT SEALABILITY

[75] Inventor: Henry G. Schirmer, Spartanburg, S.C.

[73] Assignee: W. R. Grace & Co.-Conn., Duncan, S.C.

[21] Appl. No.: 392,590

[22] Filed: Feb. 23, 1995

[51] Int. Cl.$^6$ .................. B32B 27/06; B32B 27/08; B32B 27/30; B32B 27/34

[52] U.S. Cl. .................. 428/475.8; 428/476.3; 428/483; 428/516; 428/517; 428/518; 428/910

[58] Field of Search .................. 428/517, 518, 428/516, 483, 412, 475.8, 476.3, 910

[56] References Cited

U.S. PATENT DOCUMENTS

| | | | |
|---|---|---|---|
| 326,176 | 4/1885 | Stereon . | |
| 4,626,455 | 12/1986 | Karabedian | 428/35 |
| 4,769,261 | 9/1988 | Hazelton | 428/35 |
| 5,106,677 | 4/1992 | Yeh et al. | 428/220 |
| 5,158,836 | 10/1992 | Schirmer | 428/521 |
| 5,219,666 | 6/1993 | Schirmer | 428/521 |
| 5,283,127 | 2/1994 | Blumenstein et al. | 428/476.3 |
| 5,298,202 | 3/1994 | Schirmer | 264/22 |
| 5,456,979 | 10/1995 | Schirmer | 428/336 |

FOREIGN PATENT DOCUMENTS

| | | |
|---|---|---|
| 0511127 | 10/1992 | European Pat. Off. . |
| 23 43 870.2 | 3/1975 | Germany . |
| 51-819282 | 11/1976 | Japan . |
| 54-162759 | 8/1979 | Japan . |
| 55-132243 | 7/1980 | Japan . |
| 57-087443A | 3/1982 | Japan . |

*Primary Examiner*—H. Thi Le
*Attorney, Agent, or Firm*—Thomas C. Lagaly

[57] ABSTRACT

A multilayer film is disclosed in which at least one layer thereof comprises a blend of:

a first styrene butadiene copolymer having a butadiene content of 50 weight percent or more; and a second styrene butadiene copolymer having a butadiene content of 50 weight percent or less, wherein, the total butadiene content of the blend ranges from about 30 weight percent to about 50 weight percent. When used as an outer layer of an overwrap material, such blend provides provides an improved overlap heat seal.

11 Claims, 1 Drawing Sheet

ORIENTED FILM WITH IMPROVED HEAT SEALABILITY

BACKGROUND OF THE INVENTION

The present invention relates to packaging film and, more particularly, to an oriented, multilayer film with improved overlap heat sealability.

Polyvinyl chloride (PVC) has long been used by retail food suppliers as an overwrap material to package food products such as tray-mounted cuts of meat. Such products are typically packaged by placing the food product in a foam tray, positioning a piece of PVC overwrap film over and around the tray-mounted product, gathering and overlapping the ends of the film at the underside of the tray, and then placing the underside of the tray on a hot plate until the overlapped ends of the overwrap material become tacky enough to adhere to one another, thereby forming an overlap heat seal.

One disadvantage of PVC is that hydrogen chloride gas is often produced during the heat sealing process, thereby causing corrosion to occur in the packaging room. As a result, alternatives to PVC overwrap material have been sought.

One such alternative is described in U.S. Pat. Nos. 5,158, 836 and 5,219,666. Those patents disclose an oriented, multilayer film having a very low density polyethylene (VLDPE) core layer with outer layers of a styrene butadiene copolymer (SBC). Such a film has excellent optical properties (i.e., clarity and gloss) and elasticity. Elasticity is desirable because it allows the film to return to its original shape after being handled, e.g., "poked," by customers seeking to inspect the packaged product, and results from the fact that the film is stretch-oriented during production. As is conventionally understood, the phrase "stretch-oriented" as used herein refers to a polymer-containing material which has been stretched at an elevated temperature (the orientation temperature), followed by being "set" in the stretched configuration by cooling the material while substantially retaining the stretched dimensions. Upon subsequently heating a stretch-oriented, polymer-containing material, such material will generally shrink in size (assuming it is unrestrained and unannealed). When heated to its orientation temperature, the material will shrink almost to its original (pre-oriented) dimensions.

As a result of being stretch-oriented, the foregoing multilayer film had a tendency to distort in the area of the overlap heat seal because of heat shrinkage. Such distortion is sometimes referred to as "shrinkback." Distorted heat seals are unsightly and prevent the packaged product from lying flat without wobbling, both of which are undesirable characteristics of a packaged product which is displayed for customer purchase.

Accordingly, it would be desirable to provide an oriented, multilayer film which is a suitable replacement for PVC as an overwrap material and which has improved overlap heat seal properties.

SUMMARY OF THE INVENTION

The present invention provides a multilayer film comprising at least one layer which comprises a blend of:

a first styrene butadiene copolymer having a butadiene content of 50 weight percent or more; and a second styrene butadiene copolymer having a butadiene content of 50 weight percent or less, wherein the total butadiene content of the blend ranges from about 30 weight percent to about 50 weight percent. More preferably, the total butadiene content of the blend ranges from about 30 weight percent to about 40 weight percent.

Another aspect of the present invention provides a multilayer film comprising:

(a) a core layer; and (b) two outer layers, each comprising a blend of a first styrene butadiene copolymer having a butadiene content of 50 weight percent or more; and a second styrene butadiene copolymer having a butadiene content of 50 weight percent or less, wherein the total butadiene content of the blend ranges from about 30 weight percent to about 50 weight percent.

The core layer may comprise a low density polyethylene such as, e.g., a very low density polyethylene (VLDPE). Other materials from which the core layer may be formed include, without limitation, linear low density polyethylene, ethylene vinyl acetate, ethylene vinyl alcohol, polvinylidene chloride, polyamide, polyethylene terephthalate, polyethylene carbonate, and homogeneous ethylene/alpha-olefin copolymers.

If desired, two intermediate layers, each positioned between the core layer and a respective outer layer, may be included in the multilayer film of the present invention. Such layers may be desired to provide adhesion between the core and outer layers. The intermediate layers may comprise a material selected from the group consisting of ethylene vinyl acetate copolymer, anhydride-modified polyethylene and copolymers thereof, ethylene methacrylate copolymer, and ethylene butylacrylate copolymer.

The inventor has discovered that the blend of two styrene butadiene copolymers (SBC) described above ("the SBC blend") improves the overlap heat seal properties of a multilayer film when such blend is used to form the outer layer(s) of the multilayer film. It is believed that, at hot plate temperatures which are typically encountered in the use environment (e.g., about 175° F. to about 350° F.), the tack force of an overlap heat seal formed from an oriented multilayer film with outer layers comprised of the SBC blend of the present invention is greater than the shrink force exerted by that film. As a result, the overlap heat seals produced by the multilayer film of the present invention are superior, in terms of flatness and non-distortion, to the overlap heat seals produced by multilayer films having only a single SBC in the outer layers.

In addition, the SBC blend of the present invention was found to be fully compatible with an oriented, multilayer film having a very low density polyethylene (VLDPE) core layer as disclosed in, e.g., U.S. Pat. No. 5,158,836. That is, when the SBC blend was used to form the outer layers of such multilayer film, the film had excellent optical properties (i.e., clarity and gloss) and elasticity, and could be manufactured by the same techniques as described in the '836 patent (i.e., coextrusion, hot blowing, and then stretch-orienting).

DETAILED DESCRIPTION OF THE PREFERRED EMBODIMENTS

Figure 1:
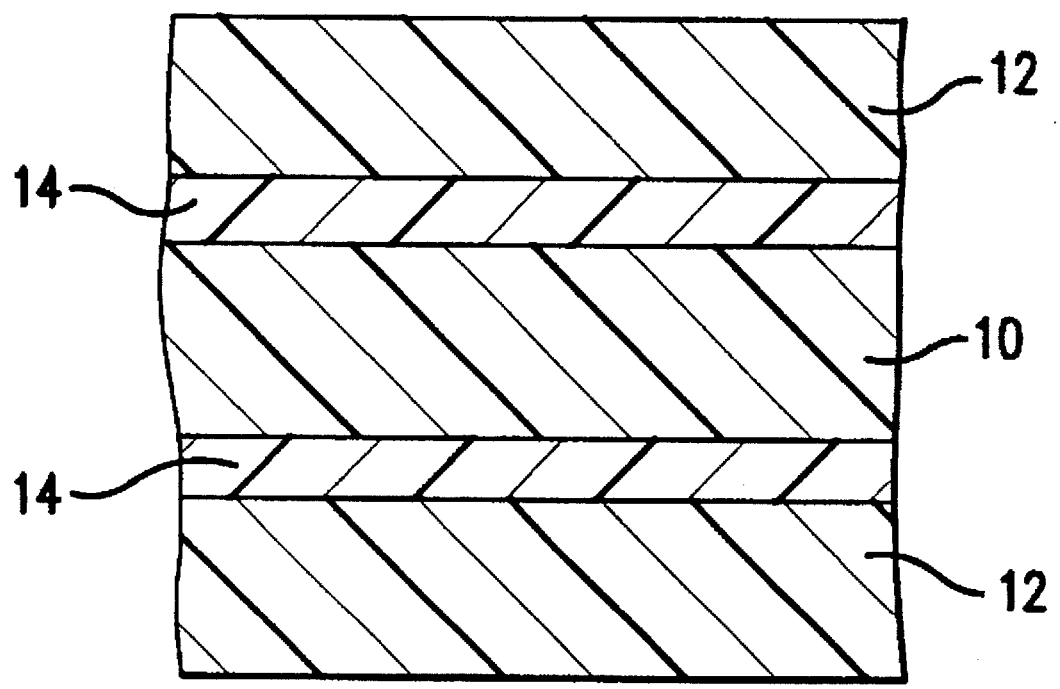
FIG. 1 is a schematic cross section of a preferred embodiment of a multilayer film in accordance with the present invention.

The multilayer film of the present invention includes at least one, but preferably two, outer layers suitable for forming an improved overlap heat seal. Such outer layers comprise a blend of:

a first styrene butadiene copolymer having a butadiene content of 50 weight percent or more; and a second styrene butadiene copolymer having a butadiene content of 50 weight percent or less, the total butadiene content of the blend ranging from about 30 weight percent to about 50 weight percent. More preferably, the total butadiene content of the blend ranges from about 30 weight percent to about 40 weight percent. The blend has been found to result in an optimum balance between: 1) sufficiently high tack force at hot plate seal temperatures to overcome the shrink force of the film, thereby resulting in a flat, non-distorted overlap heat seal, and 2) sufficiently low tack force at room temperature that individual plies of the film can be separated from one another.

As used herein, a "styrene butadiene copolymer" (SBC) refers to a thermoplastic copolymer, generally a block copolymer, containing styrene comonomer and butadiene comonomer in various proportions. Preferably, the first SBC (i.e., having a butadiene content of 50 weight percent or more) is present in the blend at a weight percentage ranging from about 10 to about 80 while the second SBC (i.e., having a butadiene content of 50 weight percent or less) is present in the blend at a weight percentage ranging from about 20 to about 90. More preferably, the first SBC is present in the blend at a weight percentage ranging from about 20 to about 50 and the second SBC is present in the blend at a weight percentage ranging from about 50 to about 80.

A suitable example of an SBC having a butadiene content of 50 weight percent or more is Stereon™ 840A, commercially available from the Firestone Synthetic Rubber & Latex Company, which has a butadiene content of about 57 weight percent. Examples of an SBC having a butadiene content of 50 weight percent or less are KK-36™ and KR-10™, both having a butadiene content of about 25 weight percent and commercially available from Phillips 66 Company.

FIG. 1 illustrates a preferred structure of the multilayer film of the present invention. Such film includes a core layer 10, two outer layers 12, and two intermediate layers 14, each positioned between core layer 10 and a respective outer layer 12.

Core layer 10 may comprise a material selected from the group consisting of very low density polyethylene, linear low density polyethylene, ethylene vinyl acetate, ethylene vinyl alcohol, polyvinylidene chloride, polyamide, polyethylene terephthalate, polyethylene carbonate, and homogeneous ethylene/alpha-olefin copolymers. Very low density polyethylene is the preferred material for core layer 10. As used herein, the phrase "very low density polyethylene," or "VLDPE," refers to ethylene/alpha olefin copolymers having densities of generally between about 0.86 and 0.92 g/cc$^2$. "Ultra low density polyethylene" is also included within the meaning of this phrase. Preferred VLDPE resins are described in U.S. Pat. No. 5,158,836, the entire disclosure of which is expressly incorporated herein by reference. An especially preferred VLDPE is a high molecular weight resin such as DEFD™ 1015 from Union Carbide.

As used herein, the phrase "homogeneous ethylene/alpha-olefin copolymers" refers to a class of homogeneous polymers which includes metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such catalysts typically have only one type of catalytic site, which is believed to be the basis for the homogeneity of the polymers resulting from the polymerization.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-pentene, 1-hexene, and 1-octene. Processes for preparing and using homogeneous polymers are disclosed in U.S. Pat. Nos. 5,206,075, 5,241,031, 5,272,236, and 5,278,272; and in PCT International Publication Nos. WO 90/03414 and 93/03093, all of which are hereby incorporated by reference herein in their respective entireties.

Intermediate layers 14 may be included to assist in bonding outer layers 12 to core layer 10, and preferably comprise a material selected from the group consisting of ethylene vinyl acetate copolymer, anhydride-modified polyethylene and copolymers thereof, ethylene methacrylate copolymer, and ethylene butylacrylate copolymer. When core layer 10 comprises VLDPE, intermediate layers 14 preferably comprise ethylene vinyl acetate copolymer (EVA). A preferred EVA is one having a vinyl acetate content above about 18 percent by weight of the copolymer and, more preferably, about 28 percent by weight of the copolymer.

Outer layers 12 comprise the SBC blend described above, i.e., a blend of a first SBC having a butadiene content of 50 weight percent or more and a second SBC having a butadiene content of 50 weight percent or less, the total butadiene content of the blend ranging from about 30 weight percent to about 50 weight percent. As such, outer layers 12 provides a flat, non-distorted overlap heat seal when placed on a hot plate as described earlier herein. In addition, the SBC blend has been found to have excellent optical properties, i.e., gloss and clarity. Accordingly, the multilayer film of the present invention may advantageously be used as an overwrap material for tray-mounted products, e.g., cuts of meat, in a retail or other environment in which packaged products are displayed for customer inspection.

As is conventional, antiblock and/or antislip agents may be included in one or more layers of the film, e.g., in outer layers 12. Such agents may facilitate ply-separation of the film after it has been coextruded and wound on a spool for storage. Examples of suitable antiblock and slip agents are set forth in the Examples below.

The multilayer film of the present invention may be made by coextrusion, hot blowing, and stretch orienting techniques which are well known in the art. When the multilayer film is to be used as an overwrap material, it is preferably biaxially oriented during the manufacture thereof, i.e., heated and stretched in both the longitudinal and transverse directions after being coextruded. The film may also be oriented in primarily one direction (monoaxially oriented) during production. In this manner, the multilayer film may be used for shrink labels on bottles and cans.

A preferred method for making the multilayer film of the present invention is disclosed in U.S. Pat. No. 5,158,836. As described therein, a predetermined number of polymeric melt streams, corresponding in number and composition to the various layers which are to be present in the resultant multilayer film, are coextruded through an annular die in a conventional manner. The tube-shaped extruded film is then hot blown by conventional techniques to form a blown bubble, i.e., by trapping air or other gas within the heated tube with a pair of pinch rollers on either side of the bubble. Preferably, the film is then reinflared into a secondary bubble to expand the film and thereby impart orientation in primarily the transverse direction, primarily the longitudinal direction, or in both the transverse and longitudinal directions. This allows the process to be flexible such that films can be produced which are oriented primarily in one direction (monoaxially oriented) or oriented in both the longitudinal and transverse directions (biaxially oriented).

The invention may be further understood by reference to the following examples, which are provided for the purpose of representation, and are not to be construed as limiting the scope of the invention.

EXAMPLES

All of the films used in the examples were prepared in accordance with the method disclosed in U.S. Pat. No. 5,158,836 and were biaxially oriented. Each of the films were oriented at a ratio of 2:1 (longitudinal direction)×2:1 (transverse direction), and had a thickness of 0.3 mil (1 mil=0.001 inch=0.0254 mm). Layers A had a thickness of 0.004 mil, layers B had a thickness of 0.04 mil, and layer C had a thickness of 0.21 mil.

The materials used in the examples are identified below (all percentages listed are weight percentages unless stated otherwise):

"SBC-1": STEREON 840A (TM); a styrene/butadiene copolymer having 57 percent butadiene comonomer and 43 percent styrene comonomer, a melt index of 12 (Condition G of ASTM D-1238) and a specific gravity of 0.96; obtained from the Firestone Synthetic Rubber and Latex Co. of Akron, Ohio.

"SBC-2": KK-36 (TM); a styrene/butadiene copolymer having 75 percent styrene comonomer and 25 percent butadiene comonomer, a melt index of 8 (Condition G of ASTM D-1238) and a density of 1.01 g/cc; obtained from Phillips 66 Company of Pasadena, Tex. (for fatty food contact).

"SBC-3": KR-10 (TM); a styrene/butadiene copolymer having 75 percent styrene comonomer and 25 percent butadiene comonomer, a melt index of 8 (Condition G of ASTM D-1238) and a density of 1.01 g/cc; obtained from Phillips 66 Company of Pasadena, Tex.

"EVA": ELVAX 3165 (TM); ethylene/vinyl acetate copolymer having 18 percent vinyl acetate comonomer, a melt index 0.7 and a density of 0.94 g/cc; obtained from E. I. DuPont de Nemours of Wilmington, Del.

"VLDPE": DEFD 1015 (TM); a high molecular weight ethylene/alpha-olefin copolymer having a density of 0.90 g/cc and a melt flow rate of about 6 g/10 minutes (ASTM D-1238, Condition 190/21.601); obtained from Union Carbide.

"AB-1": KEMAMIDE E (TM); an antiblock/slip agent which contains an amide of erucic acid; obtained from Humco Chemical, Div. of Witco Corp.

"AB-2": KAOPOLITE SFO SPECIAL (TM); an antiblock agent which contains kaolin clay and fatty acid wax; obtained from Amtor, Inc.

"SLIP": ACRAWAX C (TM); a slip agent which contains N,N'-distearoylethylene aliamine; obtained from Lonza, Inc.

"AF-1": ATMER 1010 (TM); an antifog material which contains glycerol monoleate; obtained from ICI, Inc.

"AF-2": ATMER 645 (TM); another antifog material obtained from ICI, Inc.

"AF-3": A blend of 40 percent polyethylene, 30 percent ATMER 1010, and 30 percent ATMER 645.

Example 1

A multilayer film in accordance with the present invention was prepared with the following structure:

A/B/C/B/A wherein:

A=48% SBC-1+48% SBC-2+2% AF-1+2% AF-2;

B=92% EVA+8% AF-3; and

C=VLDPE.

The film was ply-separable immediately following the coextrusion process but could not be ply-separated the following day.

Example 2

A multilayer film in accordance with the present invention was prepared with the following structure:

A/B/C/B/A wherein:

A=80% SBC-1+19.08% SBC-3+0.2% AB-1+0.48% AB-2+0.24% SLIP;

B=92% EVA+8% AF-3; and

C=VLDPE.

The film was ply-separated the following day with some difficulty.

Example 3

A multilayer film in accordance with the present invention was prepared with the following structure:

A/B/C/B/A wherein:

A=24% SBC-1+24% SBC-2+47.7% SBC-3+1% AF-1+ 1% AF-2+0.5% AB-1+1.2% AB-2+0.6% SLIP;

B=92% EVA+8% AF-3; and

C=92% VLDPE+8% AF-3.

The film was ply-separated the following day without difficulty.

Example 4 (Comparative)

A comparative multilayer film having only one SBC in the outer layer was prepared with the following structure:

A/B/C/B/A wherein:

A=96% SBC-3+2% AF-1+2% AF-2;
B=92% EVA+8% AF-3; and
C=VLDPE.

Example 5

Films produced in accordance with Examples 2–4 were tested for their ability to form good overlap heat seals. These tests were conducted by overwraping a foam polystyrene tray containing therein a wooden block with one of the films and placing the overlapped portion of the film (at the underside of the tray) on a hot plate for approximately 1 second. The resultant overlap heat seals were then qualitatively evaluated and compared. The results are summarized in Table 1.

TABLE 1

| FILM | HOT PLATE TEMP. | OVERLAP HEAT SEAL RATING |
| --- | --- | --- |
| Example 2 | 230° F. | Flat seal |
| Example 3 | 250° F. | Flat seal |
| Example 4 | 230° F. | Distorted seal |
| Example 4 | 250° F. | Distorted seal |

As this example demonstrates, multilayer films in accordance with the present invention (i.e., having a blend of two SBCs in the outer layer) result in overlap heat seals which are superior to those having, only one SBC in the outer layer. The films of Examples 2 and 3 resulted in excellent overlap heat seals (i.e., flat and without distortion) while the comparative film of Example 4 resulted in poor heat seals (i.e., bunched up, distorted, and the tray was not able to lie flat).

While the invention has been described with reference to illustrative examples, those skilled in the art will understand that various modifications may be made to the invention as described without departing from the scope of the claims which follow. For example, SBCs which are different from those described in the examples may be used. Further, more than two different SBCs may be used in the blend, provided that at least one of the SBCs has a butadiene content of 50 weight percent or more and at least one of the SBCs has a butadiene content of 50 weight percent or less, and the total butadiene content of the blend ranges from about 30 to about 50 weight percent.

What is claimed is:

1. A multilayer film comprising:
   (a) a core layer; and
   (b) two outer layers each comprising a blend of
       a first styrene butadiene copolymer having a butadiene content of 50 weight percent or more; and
       a second styrene butadiene copolymer having a butadiene content of 50 weight percent or less,
   wherein, the total butadiene content of said blend ranges from about 30 weight percent to about 50 weight percent.

2. The multilayer film of claim 1 wherein the total butadiene content of said blend ranges from about 30 weight percent to about 40 weight percent.

3. The multilayer film of claim 1 wherein said first styrene butadiene copolymer is present in said blend at a weight percentage ranging from about 10 to about 80 and said second styrene butadiene copolymer is present in said blend at a weight percentage ranging from about 20 to about 90.

4. The multilayer film of claim 3 wherein said first styrene butadiene copolymer is present in said blend at a weight percentage ranging from about 20 to about 50 and said second styrene butadiene copolymer is present in said blend at a weight percentage ranging from about 50 to about 80.

5. The multilayer film of claim 1 wherein said first styrene butadiene copolymer has a butadiene content of about 57 weight percent and said second styrene butadiene copolymer has a butadiene content of about 25 weight percent.

6. The multilayer film of claim 1 wherein said film is biaxially oriented.

7. The multilayer film of claim 1 wherein said film is oriented in primarily one direction.

8. The multilayer film of claim 1 wherein said core layer comprises a material selected from the group consisting of very low density polyethylene, linear low density polyethylene, ethylene vinyl acetate, ethylene vinyl alcohol, polyvinylidene chloride, polyamide, polyethylene terephthalate, polyethylene carbonate, and homogeneous ethylene/alpha-olefin copolymers.

9. The multilayer film of claim 1 further comprising two intermediate layers, each positioned between said core layer and a respective outer layer.

10. The multilayer film of claim 9 wherein each of said intermediate layers comprise a material selected from the group consisting of ethylene vinyl acetate copolymer, anhydride-modified polyethylene and copolymers thereof, ethylene methacrylate copolymer, and ethylene butylacrylate copolymer.

11. A product packaged with the film of claim 1.

* * * * *